(12) United States Patent
Stoer

(10) Patent No.: US 10,006,435 B2
(45) Date of Patent: Jun. 26, 2018

(54) FASTENING ROTOR BLADES TO THE HUB OF WIND TURBINES

(75) Inventor: Roland Stoer, Berlin (DE)

(73) Assignee: WINDnovation Engineering Solutions GmbH, Berlin (DE)

( * ) Notice: Subject to any disclaimer, the term of this patent is extended or adjusted under 35 U.S.C. 154(b) by 441 days.

(21) Appl. No.: 14/117,944

(22) PCT Filed: May 2, 2012

(86) PCT No.: PCT/DE2012/000465
§ 371 (c)(1),
(2), (4) Date: Nov. 15, 2013

(87) PCT Pub. No.: WO2012/155881
PCT Pub. Date: Nov. 22, 2012

(65) Prior Publication Data
US 2014/0079554 A1 Mar. 20, 2014

(30) Foreign Application Priority Data
May 17, 2011 (DE) .................... 20 2011 100 897 U

(51) Int. Cl.
*F03D 1/06* (2006.01)
*B23P 15/04* (2006.01)

(52) U.S. Cl.
CPC ............ *F03D 1/0658* (2013.01); *B23P 15/04* (2013.01); *F05B 2260/301* (2013.01); *Y02E 10/721* (2013.01); *Y10T 29/49316* (2015.01)

(58) Field of Classification Search
CPC .............................. F03D 1/0658; B23P 15/04
USPC ......................................... 416/204 R, 244 R
See application file for complete search history.

(56) References Cited

U.S. PATENT DOCUMENTS

| | | | |
|---|---|---|---|
| 4,412,784 | A | 11/1983 | Wackerle et al. |
| 6,371,730 | B1 | 4/2002 | Wobben |
| 8,408,875 | B2 | 4/2013 | Quell et al. |
| 2007/0122283 | A1 | 5/2007 | Wobben |
| 2007/0231146 | A1 | 10/2007 | Birkemeyer et al. |

(Continued)

FOREIGN PATENT DOCUMENTS

| | | |
|---|---|---|
| DE | 3103710 C2 | 3/1983 |
| DE | 19733372 C1 | 1/1999 |
| DE | 102006022272 A1 | 11/2007 |

(Continued)

OTHER PUBLICATIONS

International Preliminary Report on Patentability and Written Opinion of the International Searching Authority dated Nov. 19, 2013.

*Primary Examiner* — Woody Lee, Jr.
*Assistant Examiner* — Maxime Adjagbe
(74) *Attorney, Agent, or Firm* — Stephan A. Pendorf; Patent Central LLC

(57) ABSTRACT

The invention relates to the fastening of rotor blades to the rotor hub of wind turbines using transverse pins and tension rods in the region of the blade root. The transverse pins are arranged throughout the entire blade root shell wall and can be connected to a flange of the hub by the tension rods in the form of expansion screws. Each transverse pin (4) can be connected to the flange (2) of the rotor hub (1) by two tension rods (5, 6). Each tension rod (5, 6) is arranged in a separate tension rod bore (7, 8) in the blade root shell wall (3).

5 Claims, 3 Drawing Sheets

(56) References Cited

U.S. PATENT DOCUMENTS

2009/0263250 A1* 10/2009 Quell .................. F03D 1/0658
416/204 R

FOREIGN PATENT DOCUMENTS

EP            1840372  A2   10/2007
WO         2004106732  A1   12/2004

* cited by examiner

FASTENING ROTOR BLADES TO THE HUB OF WIND TURBINES

BACKGROUND OF THE INVENTION

Field of the Invention

For fastening rotor blades to the hubs of wind turbines, it is prior art to arrange transverse pins in the region of the blade root in recesses extending substantially transversely to the longitudinal axis of the rotor blade, and to connect these to the rotor hub using a tension rod. According to DE 31 03 710 C2, access of the tension rod to the transverse pin is provided by a passage in the shell wall of the rotor blade root.

Description of the Related Art

According to DE 197 33 372 C1, it is a disadvantage of this design that the rotor blade is significantly weakened in the region of the blade root by the passage bore for receiving the transverse pin. The solution proposed there is to design the passage bore in the form of two pocket holes and to arrange one tension rod, respectively, in two separate passages to the transverse pins located in the pocket holes.

Since these dual passages also entail weakening of the blade root material, WO 2004/106732 A1 proposes to fall back on transverse pins that go through but to place the tension rods outside the blade root.

The disadvantage of this solution is that the bending moment distribution requires a relatively large transverse pin diameter due to the greater distance of the connections of the tension rods to the respective transverse pins. This solution also applies the highest surface pressure onto the laminate edge of the blade root shell wall.

BRIEF SUMMARY OF THE INVENTION

It is the object of this invention to eliminate these disadvantages.

This object is achieved with the features of claim 1, advantageous embodiments are the subject matter of the dependent claims.

For fastening rotor blades to the rotor hub of wind turbines using transverse pins and tension rods in the region of the blade root, wherein the transverse pins pass through the blade root shell wall and can be connected to a flange in the hub using the tension rods, it is proposed, according to the invention, that each transverse pin can be connected to the flange of the rotor hub by two tension rods, wherein each tension rod is provided in a separate tension rod bore in the blade root shell wall.

It was surprisingly found that, unlike the prior art solutions cited, the forces applied to the blade root shell and therefore the stress characteristics it is subjected to can be optimized by connecting the rotor blade using two tension rods, each of which is provided in a separate through bore and can be connected to the transverse pins that penetrate the blade root shell wall.

In this way, high surface pressure onto the structurally critical laminate edges of the blade root shell wall can be prevented and shifted towards the inside of the blade root shell wall.

Furthermore, the diameters of both the transverse pins and the tension rods can be reduced, which results in a wider distribution of the reduction in blade root cross section that has been considered problematic, and allows its compensation.

Three variants are provided depending on the application:

The tension rod bores are equidistant from the outer or inner surface line, respectively, of the blade root shell wall, or the distance of the inner tension rod bore to the inner surface line of the blade root shell wall is smaller than the distance of the outer tension rod bore to the outer surface line of the blade root shell wall, or the distance of the inner tension rod bore to the inner surface line of the blade root shell wall is greater than the distance of the outer tension rod bore to the outer surface line of the blade root shell wall.

BRIEF DESCRIPTION OF THE SEVERAL VIEWS OF THE DRAWINGS

A more complete appreciation of the invention will be readily obtained by reference to the following detailed description when considered in connection with the accompanying drawings, wherein.

DETAILED DESCRIPTION OF THE INVENTION

Figure 1:
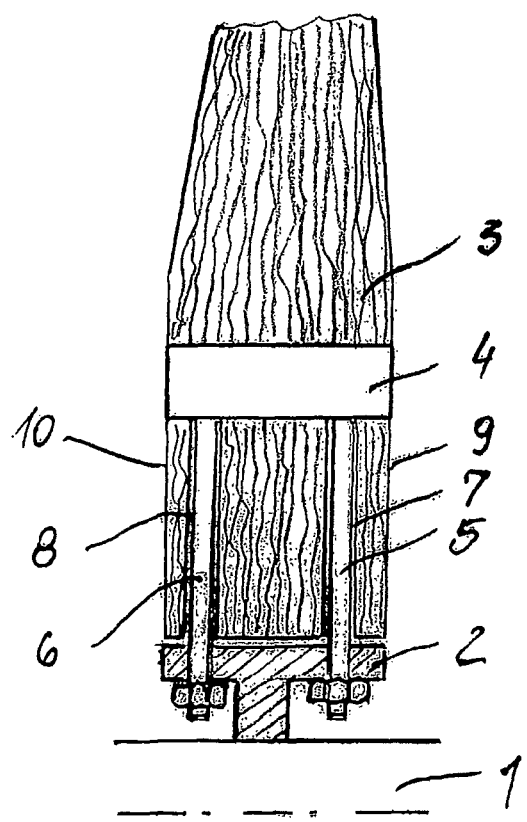
FIG. 1 shows the distance of the inner tension rod bore to the inner surface line of the blade root shell wall is smaller than the distance of the outer tension rod bore to the outer surface line of the blade root shell wall.

FIG. 1 shows a rotor hub 1 of wind turbines with an annular flange 2 for fastening the blade root of a rotor blade. Only one blade root shell wall 3 of the blade root is shown.

The rotor blade is fastened using transverse pins 4 and tension rods 5, 6 in the region of the blade root, wherein the transverse pins 4 are arranged to pass through the blade root shell wall 3.

The transverse pin 4 can be connected to the flange 2 using the tension rods 5, 6 in the form of expansion screws, wherein each transverse pin 4 is connected to the flange 2 of the rotor hub 1 by two tension rods 5, 6 and each tension rod 5, 6 is arranged in a separate tension rod bore 7, 8 in the blade root shell wall 3.

In FIG. 1 the distance of the inner tension rod bore to the inner surface line of the blade root shell wall is smaller than the distance of the outer tension rod bore to the outer surface line of the blade root shell wall.

Figure 2:
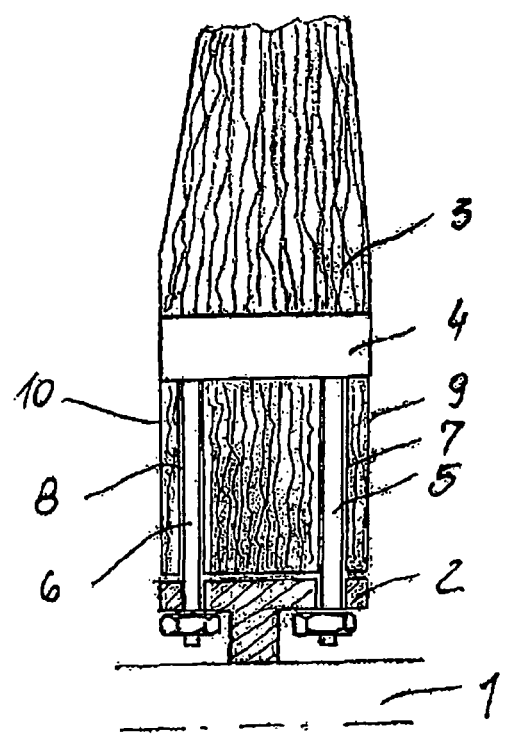
FIG. 2 shows the tension rod bores are equidistant from the outer or inner surface line, respectively, of the blade root shell wall.

In FIG. 2 the tension rod bores 7, 8 are equidistant from the outer or inner surface line 9, 10, respectively, of the blade root shell wall 3.

Figure 3:
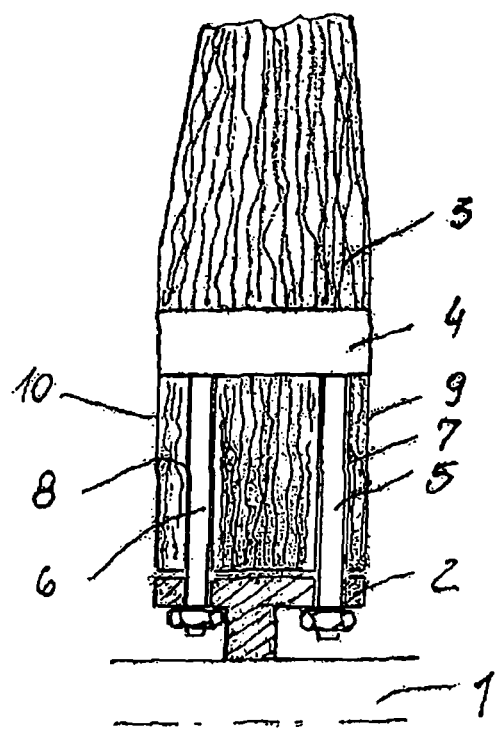
FIG. 3 shows the distance of the inner tension rod bore to the inner surface line of the blade root shell wall is greater than the distance of the outer tension rod bore to the outer surface line of the blade root shell wall.

In FIG. 3 the distance of the inner tension rod bore to the inner surface line of the blade root shell wall is greater than the distance of the outer tension rod bore to the outer surface line of the blade root shell wall.

LIST OF REFERENCE SYMBOLS

1 Rotor hub
2 Flange of the rotor hub

3 Blade root shell wall
4 Transverse pin
5 Tension rod
6 Tension rod
7 Tension rod bore
8 Tension rod bore
9 Outer surface line of the blade root shell wall
10 Inner surface line of the blade root shell wall

The invention claimed is:

1. A wind turbine comprising rotor blades fastened to a rotor hub of the wind turbine,
   wherein each rotor blade has a blade root, wherein the blade root has a blade root shell having a blade root shell wall having an outer surface line (9) and an inner surface line (10),
   wherein the rotor hub has a flange,
   wherein the rotor blades are fastened to the rotor hub by fastening means provided in the region of the blade root, each fastening means comprising one transverse pin, one inner tension rod and one outer tension rod, each tension rod in the form of an expansion screw having first and second ends,
   wherein the transverse pin passes through the blade root shell wall,
   wherein the inner tension rod (5) and the outer tension rod (6) are connected at their first end to the transverse pin and connected at their second end to the flange of the hub, and wherein the transverse pin (4) is connected by the inner and outer tension rods (5, 6) to the flange (2) of the rotor hub (1), and
   wherein the inner tension rod (5) is arranged in an inner tension rod bore (7) and the outer tension rod (6) is arranged in an outer tension rod bore (8) in the blade root.

2. The wind turbine according to claim 1, wherein the outer and inner tension rod bores (7, 8) are equidistant from the outer and inner surface line (9, 10), respectively, of the blade root shell wall (3).

3. The wind turbine according to claim 1, wherein the distance of the inner tension rod bore (8) to the inner surface line (10) of the blade root shell wall (3) is smaller than the distance of the outer tension rod bore (7) to the outer surface line (9) of the blade root shell wall (3).

4. The wind turbine according to claim 1, wherein the distance of the inner tension rod bore (8) to the inner surface line (10) of the blade root shell wall (3) is greater than the distance of the outer tension rod bore (7) to the outer surface line (9) of the blade root shell wall (3).

5. A method for fastening a rotor blade to a flange of a rotor hub of a wind turbine, comprising:
   providing a rotor blade having a blade root, wherein the blade root has a blade root shell having a blade root shell wall (3) having an outer surface line (9) and an inner surface line (10) and at least one inner tension rod bore (7) and at least one outer tension rod bore (8) in the blade root,
   fastening the rotor blade to the flange of the rotor hub by fastening means provided in the region of the blade root, each fastening means comprising one transverse pin, one inner tension rod and one outer tension rod, each tension rod in the form of an expansion screw having first and second ends, comprising the following steps
   passing the transverse pin through the blade root shell wall,
   connecting the inner tension rod (5) and the outer tension rod (6) at their first end to the transverse pin and at their second end to the flange of the hub, whereby the inner tension rod (5) is arranged in the inner tension rod bore (7) and the outer tension rod (6) is arranged in the outer tension rod bore (8) in the blade root, and whereby the transverse pin (4) is connected by the inner and outer tension rods (5, 6) to the flange (2) of the rotor hub (1).

* * * * *